Sept. 22, 1970  G. W. PRATT, JR., ET AL  3,530,400
ACOUSTICALLY MODULATED LASER
Filed Aug. 30, 1966  2 Sheets-Sheet 1

INVENTORS
GEORGE W. PRATT JR.
JOSE E. RIPPER
BY *Robert T Dunn*
ATTORNEY

INVENTORS
GEORGE W. PRATT JR.
JOSE E. RIPPER
BY Robert T. Dunn
ATTORNEY

United States Patent Office 3,530,400
Patented Sept. 22, 1970

3,530,400
ACOUSTICALLY MODULATED LASER
George W. Pratt, Jr., Wayland, and Jose E. Ripper, Arlington, Mass., assignors to Massachusetts Institute of Technology, Cambridge, Mass., a corporation of Massachusetts
Filed Aug. 30, 1966, Ser. No. 576,094
Int. Cl. H01s 3/10
U.S. Cl. 331—94.5                    9 Claims

ABSTRACT OF THE DISCLOSURE

Laser apparatus is described wherein the frequencies of the allowable modes of radiation are modulated by acoustically varying the index of refraction of the active lasing medium. The wavelength of the acoustic energy applied to the active lasing medium is large enough so that substantially uniform acoustic wave pressure exists throughout the active laser medium at any given time.

This invention relates to methods and means for modulating a laser, and more particularly for frequency modulation of a laser employing acoustic waves.

Heretofore, acoustic waves have been applied to a laser or maser device for the purpose of controlling operation of the device. For example, acoustic waves have been launched into a laser or maser medium in the direction of the resonant axis of the device, so that the waves travel paths parallel to the electromagnetic radiation which undergoes amplification by the process of stimulated emission. The acoustic wave fronts function as reflection surfaces for the electromagnetic radiation adding a Doppler shift to the radiation. In one application of this type, the wave fronts of the acoustic waves spoil cavity resonance so that the maser device performs only as an amplifier of certain incident radiation. As it happens in such devices, the electromagnetic radiation undergoes a Doppler shift when it reflects from the moving acoustic wave front and this Doppler shift appears in the output frequency of the amplifier radiation issuing from the maser. Generally such a frequency shift is not desired, but since it is so very small (the acoustic wave frequency is so much less than the electromagnetic wave frequency), the shift is ignored and does not particularly interfere with utilization of the device.

It is one purpose of the present invention to provide methods and means for directly modulating the frequency of a laser or maser device by directing acoustic energy to the device, whereby the frequency of the acoustic energy and/or useful modulations thereof appear in the electromagnetic radiation issuing from the laser.

It is another object of the present invention to provide methods and means for frequency modulation of a semiconductor laser by acoustic waves.

It is another object of the present invention to provide methods and means for modulating the frequency of a laser oscillator.

In accordance with features of the present invention, acoustic waves are launched into a laser or maser medium so as to modulate the laser output frequency. The preferred laser medium is a semiconductor material and various embodiments described herein include semiconductor material as the laser medium. However, many of the features of the present invention and effects of the acoustic waves on operation of the laser are applicable to other solid laser materials and some of the effects are applicable to fluid laser mediums as well. In the semiconductor medium, the acoustic waves cause a deformation in the semiconductor crystal lattice and this in turn produces a strain in the lattice. The effects of the strain, when analyzed along different lattice axes, show that the laser output frequency along a given axis depends upon the strain along that axis. It can be shown that the output frequency along a given axis is dependent upon the applied stress and also on the deformation potentials of the valence and conduction bands or initial and final levels of the radiative transitions. We have discovered that the selection of the semiconductor material, the relationship of the laser cavity axis to the crystalline lattice axes of the material, the magnitude and direction of strains produced by acoustic energy launched into material, as well as the frequency of the acoustic energy are all important factors to be considered in order to modulate the laser output frequency for useful purposes.

In a particular embodiment of the present invention, a gallium arsenide semiconductor laser is energized sufficiently by pump energy to produce laser operation. The laser radiation issues from an optical cavity defined by the active region of the gallium arsenide and by optically parallel reflective surfaces at each end of the gallium arsenide cavity. For example, the cavity can be formed by the active region of a gallium arsenide diode and the faces of the diode which form planes perpendicular to the plane of the active region. Means are provided for launching acoustic energy into the gallium arsenide medium so that the acoustic energy wavefronts are substantially parallel to the plane of the active region. Thus the acoustic waves travel perpendicular to the cavity axis. In addition, the acoustic waves preferably travel perpendicular to the junction of the diode and the acoustic wavelength should be at least greater than twice the thickness of the lasing region of the junction. Thus for a gallium arsenide injection laser, the upper limit of the acoustic frequency is about 2 kmc.

In order to produce the maximum modulation from the acoustic input, the preferred relationship between acoustic wavelength and the thickness of the lasing region of the laser arises from the desirability of imposing substantially the same strain upon the whole lasing region at the same instant of time and changing the direction of this strain throughout the whole lasing region at the same instant of time. Accordingly, it is preferred that the whole lasing region of the laser experience substantially the same compression or rarefaction produced by the acoustic waves at the same instant of time. As will be seen, when the acoustic wavelength is substantially greater than twice the thickness of the lasing region, this condition is more precisely met.

Other features and objects of the present invention will be apparent from the following specific description taken in conjunction with the figures in which.

The deformation potentials for the valence and conduction bands of a number of semiconductor materials have been investigated recently. For example, in the bulletin of the American Physical Society, vol. 10, 84 (1965) in an article by Calawa, Butler and Rediker, empirical studies are described by which the pressure coefficient (the fractional change in dielectric constant as a ratio to pressure) for PbSe was found to be $3.3 \times 10^{-6}$ atmospheres$^{-1}$. Other empirical tests yield a value for this parameter for gallium arsenide as about $1.6 \times 10^{-6}$ atmospheres$^{-1}$. There are two important effects of pressure on the laser frequency. First, there is a change in the energy gap due to differences in deformation potentials for the valence and conduction bands of the semiconductor material. Second, and not unrelated, the refractive index of the material is changed. Since the index of refraction $n$ and dielectric constant $\epsilon$ are directly related, any variation in the one is accompanied by a corresponding variation in the other. As is well known, the energy gap is determinative of the frequency of radiation produced by spontaneous emission phenomena within the material, and the index of refraction is determinative of the allowable mode frequencies which can be sustained by the semiconductor cavity. As a result, these two effects of pressure on the semiconductor material are determinative in establishing the output frequency from the laser subjected to pressure.

A solution of Maxwell's equations for a material having a time-varying refractive index yields a modulation index, denoted $m_f$, which is proportional to the ratio of the cavity mode frequency to the frequency of variation of the refractive index, $v_0/v_s$, times the fractional change in the dielectric constant of the semiconductor material, $\delta\epsilon/\epsilon$. If the semiconductor material is gallium arsenide, the fractional change in dielectric constant, as mentioned above, is estimated to be about $1.6 \times 10^{-6}$ atmosphere$^{-1}$ and the mode frequency for gallium arsenide is about $1.75 \times 10^{-6}$ mc. Thus, the modulation index, $m_f$ for gallium arsenide is on the order of $2.8 \times 10^2 \, P/v_s$ where $P$ is the time-varying pressure in atmospheres and $v_s$ is the rate of variation of the pressure in megacycles. Acoustic waves can be employed to provide the time-varying refractive index and the accompanying fractional change in dielectric constant. The maximum acoustic frequency is determined by the general requirement that the pressure at any instant be constant over the light generating region (laser region) of the laser.

Accordingly, when acoustic waves are employed to provide the time varying pressure, then $v_s < C/2D$, where $C$ is the sound velocity and $D$ is the thickness of the light generating region (lasing region) of the junction. For gallium arsenide, the upper limit of $v_s$ is estimated to be 2 kmc.

Figure 1:
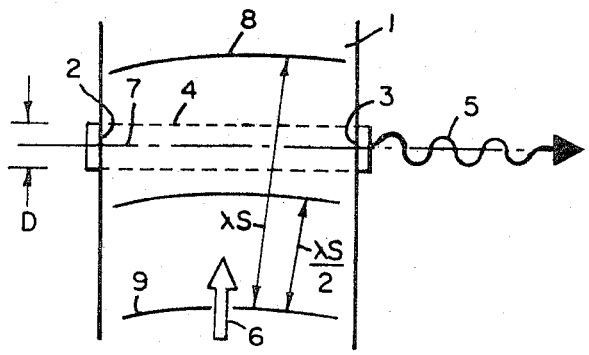
FIG. 1 is a diagram illustrating a resonant cavity and the direction of acoustic energy directed thereto.

FIG. 1 illustrates the above described relationship between the acoustic wave length and direction relative to the axis of the laser cavity and the thickness of the lasing region therein. As shown in FIG. 1, a suitable laser material or medium 1 is enclosed between optically parallel reflecting surfaces 2 and 3 to define the laser cavity 4. These faces could be formed by the boundaries of the laser material itself. Energy is pumped into the material 1 so that lasing occurs in the region 4, which is defined as the laser cavity and is the resonant volume lying between two reflecting surfaces 2 and 3. One of the reflecting surfaces, such as 3, is preferably partially transparent so that laser radiation 5, generated within the cavity by the process of stimulated emission issues therefrom and is directed toward a target for utilization. This radiation is of course electromagnetic and at a frequency determined principally by the energy level band structure of the material 1 and the dimensions of the cavity 4. In accordance with the present invention, acoustic energy is directed and launched into the material 1 in the direction of arrow 6, which is substantially transverse to the axis 7 of the laser cavity. In addition, the wave length $\lambda_s$ of the acoustic energy is preferably greater than twice the thickness $D$ of the cavity, so that the sound pressure across the acoustic wave fronts, such as 8 and 9, is substantially constant over the whole of the cavity 4, or at least so that the whole of cavity 4 is subject to the same excursion of the sound pressure at the same instant of time. As can be seen, when $\lambda_s/2 = D$, the sound pressure may not be uniform throughout the whole of the cavity 4, but at least will be at the same excursion of the acoustic wave pressure. As $\lambda_s$ increases greatly with respect to $D$, the condition of uniform pressure throughout the cavity at any instant is more closely achieved.

Figure 7:
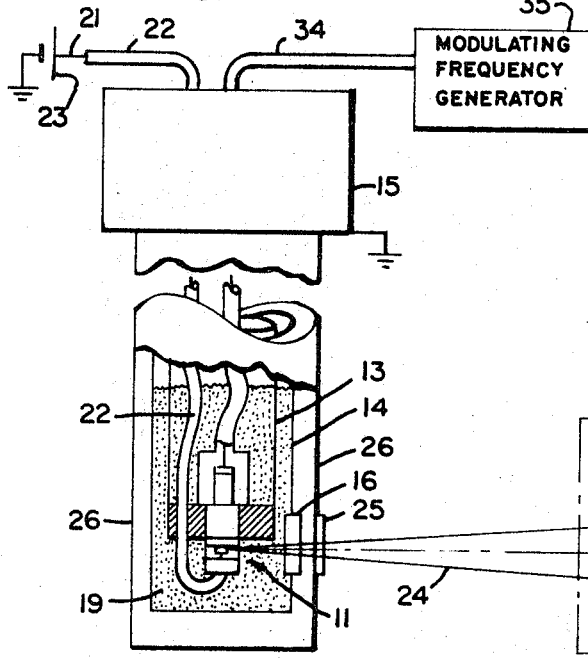
FIG. 7 is a partially sectioned view of a system, including an acoustically modulated semiconductor laser transmitting radiation to a Fabry-Perot interferometer, by which the acoustic modulations are detected.
Figure 8:
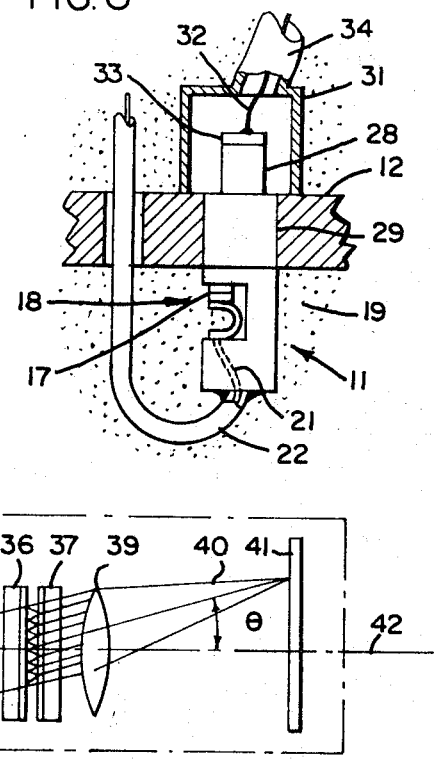
FIG. 8 is an enlarged sectional view of the semiconductor laser, shown in FIG. 7.

It can be shown that the acoustic power required to achieve a given modulation index $m_f$ at a given frequency $v_s$ in a gallium arsenide laser is of the order of $5 \times 10^{-7} v_s^2 m_f^2$ watts/cm.$^2$. A structure employing such a gallium arsenide injection laser is illustrated in FIGS. 7 and 8. With this structure, a modulation index of 75 can be achieved with a frequency deviation of at least 150 megacycles. The structure includes a gallium arsenide injection diode assembly 11 mounted on a block of copper 12, which serves as a heat sink as well as support for the laser assembly. The block is mounted at the end of the holding tube 13 and disposed within the liquid helium chamber 14 of a dewar flask 15. The liquid helium chamber 14 has a window 16 in alingment with the junction 17 of the gallium arsenide diode 18 in the assembly 11 and is filled with liquid helium 19, so that the gallium arsenide diode 18 is completely immersed in the liquid helium and maintained at a temperature in the range of 4.2° K. This temperature can be lowered by pumping to achieve superfluid $H_e$ which helps to maintain a uniform temperature in the lasing region. This can be important for stability.

Electrical energy to the diode is carried by an electrical lead 21 within a shield 22 attached to the end of the assembly 11 and this shielded lead runs up through the copper sink, out through the top of the dewars flask 15, to a source of electrical energy 23. When the diode 18 is energized at a sufficient level, lasing action takes place and laser radiation 24 emitted from the junction 17 of the diode emerges from the window 16 and passes through a second window 25 in the evacuated tube 26, which encloses the helium chamber.

Acoustic energy is applied to the gallium arsenide diode by a quartz transducer 28, which abuts the copper base 29 of the laser assembly 11. The transducer 28 is attached to the base 29 so that acoustic energy is transmitted from the transducer to the base, to the gallium arsenide diode 18, and is conducted through the diode in directions substantially transverse to the junction 17, just as already described above with reference to FIG. 1.

The quartz transducer 18 is preferably electrically shielded to avoid pickup by the diode and within an enclosure 31. Electrical lead 32 attaches via gold bond 33 to the transducer and is carried therefrom within a coaxial line 34 out through the top of the dewar flask 15 to a source of high frequency electrical energy, such as high frequency generator 35'. In operation, both the laser and the transducer are energized simultaneously so that acoustic energy at a frequency preferably less than 1 kilomegacycle is directed into the gallium arsenide diode 18, substantially transverse to the junction 17 of the diode. The intensity of the acoustic energy is sufficient to produce a useful modulation index, $m_f$, of the emitted laser radiation 24, so that these modulations can be detected by suitable equipment upon which the radiation is incident.

Figure 9:
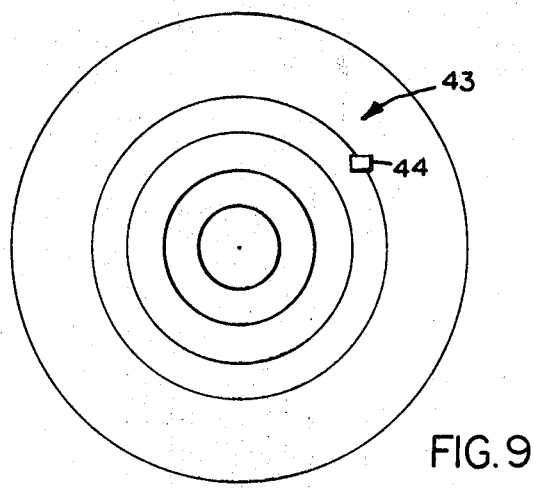
FIG. 9 illustrates the pattern of rings produced in the Fabry-Perot interferometer, which indicates the acoustic modulations.

As an example of one method for detecting the modulations of the laser radiation 24, a Fabry-Perot interferometer 35 may be employed which intercepts the laser beam 24. As is well known in the art, the Fabry-Perot interferometer is an instrument which produces fringes in the light issuing therefrom due to multiple reflections between two mirrors 36 and 37 within the instrument. The arrangement of these mirrors and lens systems 38 and 39 cooperating therewith, is such that the radiation 40 issuing from the interferometer when brought to a focus on a screen, such as screen 41, produces light and dark rings on the screen, the light indicating areas of radiation reinforcement and dark indicating areas of radiation cancellation. The condition for reinforcement is as follows: $2d \cos \theta = N\lambda_0$ where $d$ is the separation between the mirrors 36 and 37, N is an integer and $\lambda_0$ is the wavelength of the light and is fulfilled at all points on a circle on the screen 41 centered on the axis 42 of the interferometer. FIG. 9 showed such a pattern of equally spaced rings 43 that is produced as a result of laser radiation 24 incident upon the Fabry-Perot interferometer when the laser is operated without the application of acoustic energy thereto. When, however, the acoustic energy is applied which causes the frequency modulation of the laser radiation 24, as already described above, the pattern of rings is blurred because the radiation incident upon the Fabry-Perot interferometer is no longer that of a single frequency, but now consists of the original frequency accompanied by several sidebands, each of which sets up different ring patterns on the screen. Thus, the ring patterns produced by this range of laser frequencies blend one into another. This results in an apparent broadening of the rings seen without sound and may entirely blur the ring pattern. The observed change with sound depends on the frequency and intensity of the sound.

The description above of the use of the Fabry-Perot interferometer for detecting the occurrence of the frequency modulations upon the laser beam is but one structure for detecting such modulations. The Fabry-Perot interferometer can also be used in conjunction with a photo-responsive device to detect the frequency modulations of the laser beam 24. Thus, the FM beam 24 is converted to an AM signal. For this purpose, a photomultiplier tube can be employed to intercept a small section 44 of the ring diffraction patterns form the interferometer. The intensity of the section of the diffraction pattern is time-varying at the frequency of the modulation (acoustic frequency) and so the photomultiplier output contains a signal at this frequency.

The above use of the interferometer as an FM to AM converter is particularly useful when the modulated laser beam 24 incident thereon is substantially a parallel light beam. This occurs when the interferometer is located a substantial distance from the laser. The pattern produced by the interferometer is then only a small section of the ring diffraction pattern and so substantially the whole output from the interferometer can be directed to the photomultiplier to generate the AM signal. Many uses of such a transmit-receive system immediately come to mind. For example, the acoustic energy directed to the laser can be modulated by information signals such as human voice and these modulations can be detected in the output from the photomultiplier.

Other structures, such as optical mixers or other non-linear devices, can be substituted for the interferometer for detecting the acoustic modulations of the laser beam 24. The interferometer is described as just one such device.

Figure 2:
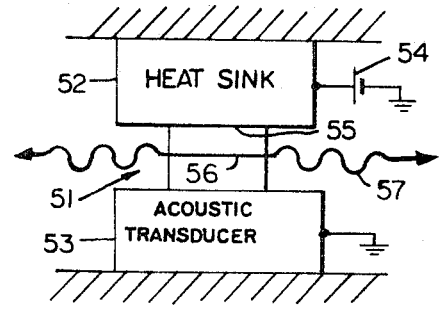
FIGS. 2 and 3 show injection lasers in which acoustic energy is applied directly to the semiconductor, as in FIG. 2, or through a heat sink as in FIG. 3.

Other methods and means for achieving high frequency acoustic modulation of a laser beam are illustrated in FIGS. 2 to 6. As shown in FIG. 2, a p-n junction injection laser 51 is disposed between a heat sink 52 and an acoustic transducer 53, so that the diode is sandwiched between the heat sink and the acoustic transducer. Electric current is applied from a source 54 through the heat sink and the ohmic contact 55 to the diode junction 56. As the same time, acoustic energy from hte transducer is launched in a direction transverse to the diode junction and is of sufficient intensity so that the radiation 57 issuing from the diode is usefully modulated in frequency.

Figure 3:
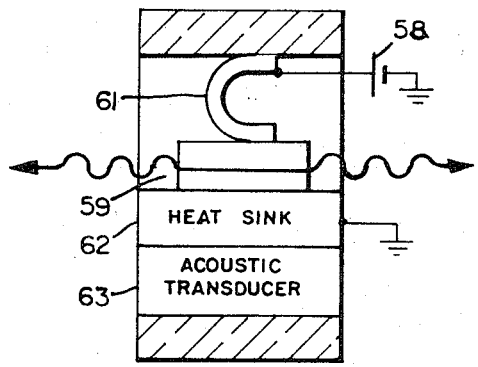

Another and similar structure is shown in FIG. 3 wherein a source of electrical energy 58 is directly connected to the diode 59 via ohmic contact 61 and the electrical circuit through the diode is completed through a heat sink 62 of properly chosen material, abutting the opposite face of the diode. In this embodiment, the acoustic energy is launched from a transducer 63 into the heat sink and conducted therethrough and into the diode. For this purpose, the heat sink may focus the acoustic energy so as to achieve optimum modulation factors.

Figure 4A:
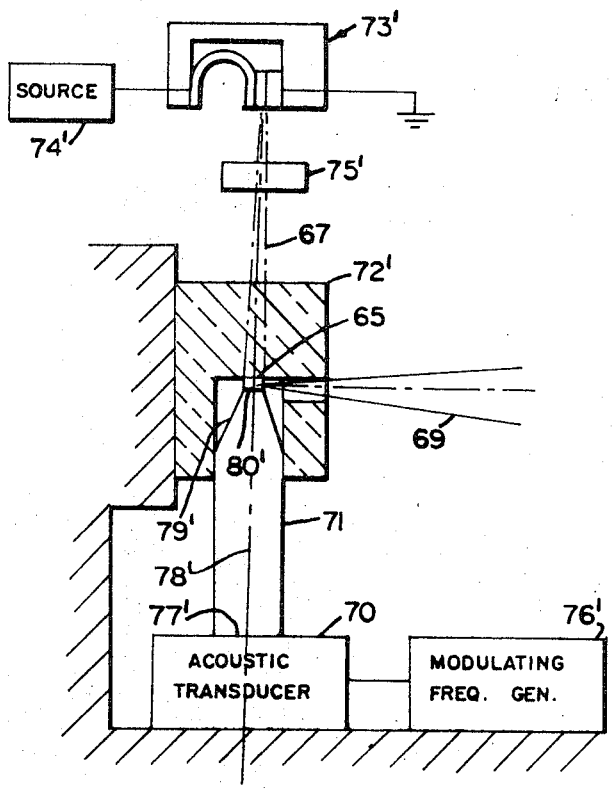
FIGS. 4a and 4b illustrate an optically pumped laser to which focused acoustic energy is directly applied.
Figure 4B:
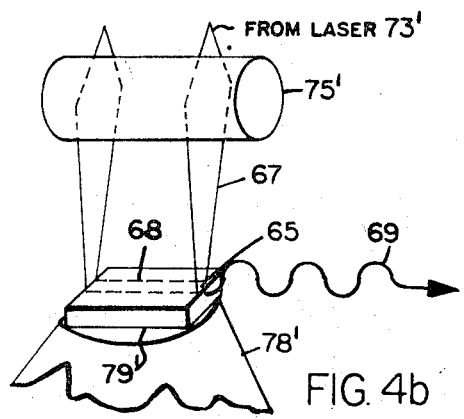

In FIG. 4a the laser includes a chip of semiconductor 65 to which optical pumping radiation 67 is directed, so that lasing action occurs within a thin region 68 of the material. The optical pumping radiation is of sufficient intensity to produce laser radiation 69 which issues from the cavity 68 as shown. Acoustic energy is directed to the cavity 68 from an acoustic transducer 70 via a quartz acoustic focusing rod 71 abutting the chip if semiconductor 65 and is directed thereto so as to be incident upon the cavity 68 as described above, with reference to FIG. 1. The pumping radiation 67 is directed through a quartz housing, which is joined to the semiconductor cavity in order to achieve greater acoustic efficiency.

The pumping radiation 67 is preferably monochromatic and may be provided by a GaAs diode laser 73' energized by a source of electric current 74'. A cylindrical lens 75' serves to focus this pumping radiation on the zone 68 of the semiconductor chip 65, which is within an optical cavity having an axis substantially transverse to the pumping radiation. The quartz housing 72' is transparent to the pumping radiation and provides a mechanical ground against which the acoustic waves transmitted by the focusing rod 71 compress the chip 65 producing the substantially uniform compressions and rare-factions of the lasing zone 68, as already described above with reference to FIG. 1.

In operation, the acoustic transducer 70 is energized at microwave frequency by the modulating signal source 76'. The transducer delivers acoustic energy to the relatively large optically flat surface 77' at the lower end of the focusing rod 71. Thus, the lower end of the rod is uniformly energized, producing substantially flat, highly directional acoustic wavefronts which are transverse to the axis 78' of the rod. This enegy travels up the rod and is focused or concentrated by the converging end 79' of the rod onto a second optically flat surface 80', which is relatively small. The chip 65 is firmly held between this surface, 80', and the grounded holder 72', so that a substantial portion of this highly directional acoustic energy incident upon the surface 80' is transmitted to the chip in a direction transverse to the axis of the optical cavity 68.

The optically flat parallel surfaces 77' and 80' insure that substantially all acoustic waves conducted by the rod 71 travel parallel to the axis of the rod and have substantially flat wave fronts. Acoustic transmission through the rod to the chip may be further enhanced if the acoustic cavity defined by the surfaces 77' and 80' is acoustically resonant at the acoustic frequency.

Figure 5:
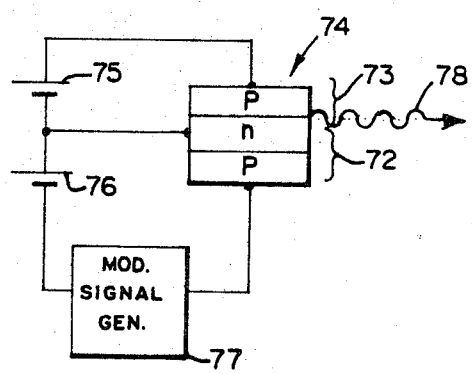
FIG. 5 illustrates use of a piezo electric semiconductor for generating the acoustic energy and formed in a complex junction with the laser diode junction.
Figure 6:
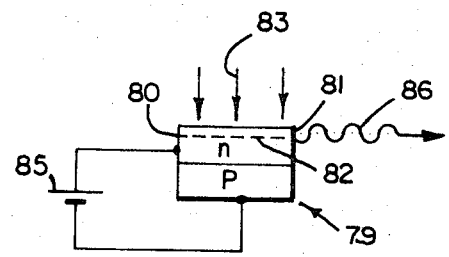
FIG. 6 illustrates a piezo electric semiconductor combined with an optically pumped laser formed in one of the semiconductor layers of the piezo electric semiconductor diode.

FIGS. 5 and 6 illustrate structures including a piezo electric semiconductor in combination with a semiconductor laser, all preferably formed in the same crystal of semiconductor material, so that the acoustic energy is generated within the crystal and conducted through the lasing region therein, as described above with reference to FIG. 1. In FIG. 5 a depletion layer transducer 72 and a p-n junction laser 73 parallel to it are formed within a single crystal 74 of semiconductor material. The depletion layer transducer 72 is reverse biased. For this purpose, the electrical energy source 75 provides energy to the p-n laser junction and source 76 provides energy to the depletion layer transducer. In operation, the electrical energy from source 76, which energizes the depletion layer transducer is modulated by the modulation generator 77. The frequency of this modulation is selected to provide the desirable acoustic wave frequency within the crystal 74, which is suitable for modulating the laser beam 78, as already described above with reference to FIG. 1.

The depletion layer transducer formed in a crystal such as GaAs which exhibits substantial piezo electric effect will generate acoustic energy of sufficient intensity to modulate the p-n junction laser in accordance with the principles of the present invention. The depletion layer junction produces acoustic waves which travel transverse to the junction and in the same direction as current flows through the junction. Accordingly, the acoustic waves so generated are properly directed to the p-n laser junction to produce the modulations in the manner described above, with reference to FIG. 1.

In FIG. 6, the depletion layer transducer again is the source of acoustic energy. The acoustic energy modulates an optically pumped laser which may be energized as described above with reference to FIGS. 4a and 4b. In this case, the laser is formed in one zone of the transducer 79. The laser cavity is defined between optically parallel surfaces 80 and 81 and includes a thin region 82 of, for example, the $n$ zone to which the optical pumping radiation 83 is directed in sufficient intensity to produce lasing action. In operation, optical energy of sufficient intensity is directed to the region 82, and at the same time the depletion layer junction is energized by a source 85, so as to generate acoustic energy of sufficient intensity to modulate the laser radiation 86, issuing from the region 82 in a useful manner.

This completes descriptions of a number of embodiments of the present invention of methods and means for modulating the radiation from a laser, including a laser cavity to which pumping energy is delivered of sufficient intensity to produce lasing action therein and to which acoustic energy is directed substantially transverse to the axis of the cavity and of sufficient intensity to produce useful frequency modulation of the laser energy issuing from the cavity. Various embodiments of the present invention are described by way of examples of applications thereof and are not intended to limit the spirit and scope of invention as set forth in the accompanying claims.

What is claimed is:

1. A semiconductor laser device adapted to provide frequency modulated laser radiation comprising, in combination, an optical cavity defined by optically flat reflecting surfaces and containing a medium adapted to receive pumping energy to produce in the active part thereof an inverted population of energy states so that electromagnetic radiation therein is amplified by the process of stimulated emission, at least one of said reflecting surfaces being partially transparent to allow the laser radiation to be emitted from said cavity, the medium being a thin planar laser junction region of the semiconductor, means for pumping said medium to produce an inverted population of energy states in the active part thereof to sustain said stimulated emission, means for generating acoustic wave energy and for directing the same to said medium, said acoustic energy being directed to the medium substantially transverse to the optical axis thereof and perpendicular to the plane of the thin planar laser junction region, the wavelength of said acoustic energy being not less than twice the transverse dimension of the active part of the thin planar laser junction region and the acoustic wave fronts thereof extending across a substantial portion of the length and width of the thin planar laser junction region so that each portion of the active part of the medium experiences, at each instant of time, either compression or rarefaction, the radiation issuing from the cavity being thereby frequency modulated at a rate determined by the frequency of said acoustic energy.

2. A semiconductor laser device as claimed in claim 1 in which the means for generating the acoustic energy includes a transducer joined to the semiconductor to provide a solid acoustic transmission path from the transducer to the medium and adapted to introduce highly directional acoustic modulating energy at least in the megacycle frequency range to said medium.

3. A semiconductor laser as claimed in claim 2 in which the means for generating the acoustic energy is an acoustic transducer attached directly to the semiconductor so that acoustic energy is transmitted directly from the transducer to the semiconductor.

4. A semiconductor laser as claimed in claim 3 in which the acoustic transducer is attached to one surface of the semiconductor and a heat sink is attached to another surface, the semiconductor being thereby sandwiched between the heat sink and the acoustic transducer.

5. A semiconductor laser as claimed in claim 2 in which the means for generating the acoustic energy is an acoustic transducer attached to a rod and the semiconductor is mounted on the rod, the acoustic energy being transmitted from the transducer to the semiconductor via the rod.

6. A semiconductor laser as claimed in claim 5 in which the transducer is joined to one end of the rod and the semiconductor is joined to the other end thereof, said one end being a relatively large optically flat surface and said other end converging to an optically flat surface to provide substantially flat acoustic wave fronts which shall travel in the rod along a path parallel to the axis of the rod and into the semiconductor thereby to present highly directional acoustic wave energy to the medium.

7. A laser device as claimed in claim 1 in which the means for pumping comprises optical pumping means adapted to direct optical pumping radiation to said medium.

8. A laser device as in claim 1 in which said medium and said means for producing said acoustic wave energy are both formed within a single crystal of semiconductor material exhibiting substantial piezo electric characteristics, said means for producing acoustic wave energy being formed in said single crystal by a depletion-layer junction and said medium being part of said crystal, and means for energizing said depletion-layer junction to produce said acoustic energy, the acoustic waves generated at said depletion-layer junction being directed to said medium along a path within the crystal and being of sufficient intensity to modulate the frequency of laser radiation issuing from said cavity for a useful purpose.

9. A method of frequency modulating the radiation generated in the lasing region of a longitudinally extending laser medium, that comprises, generating laser-type radiations throughout said lasing region; during said generating, subjecting substantially the whole lasing region substantially simultaneously and uniformly to acoustic vibrations transversely along substantially the whole lasing region; adjusting the wavelength of said vibrations relative to a transverse dimension of said lasing region such that substantially the whole lasing region experiences, at the same instant of time, either compression or rarefaction; and varying said wavelength within limits such that substantially said whole lasing region always experiences, at each instant of time, either compression or rarefaction while maintaining the acoustic vibrations substantially uniformly along substantially said whole lasing region.

References Cited

UNITED STATES PATENTS

| | | | |
|---|---|---|---|
| 3,247,386 | 4/1966 | Vickery | 331—94.5 |
| 3,297,876 | 1/1967 | De Maria | 331—94.5 |
| 3,387,230 | 6/1968 | Marinace | 331—94.5 |
| 3,389,348 | 6/1968 | De Maria | 331—94.5 |

OTHER REFERENCES

Nathan et al., Injection Lasers: State of the Art. Electronics, vol. 36, No. 49 (Dec. 6, 1963), pp. 61–65.

WIILLIAM L. SIKES, Primary Examiner

U.S. Cl. X.R.

350—160